US012596751B2

(12) United States Patent
 Cunico et al.

(10) Patent No.: US 12,596,751 B2
(45) Date of Patent: Apr. 7, 2026

(54) IMAGE SYNTHESIS BASED ON PREDICTIVE ANALYTICS

(71) Applicant: International Business Machines Corporation, Armonk, NY (US)

(72) Inventors: Hernan A. Cunico, Holly Springs, NC (US); Craig M. Trim, Ventura, CA (US); Shikhar Kwatra, San Jose, CA (US); Caleb Miles, Columbia, MO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 207 days.

(21) Appl. No.: 17/568,110

(22) Filed: Jan. 4, 2022

(65) Prior Publication Data

US 2023/0229707 A1     Jul. 20, 2023

(51) Int. Cl.
 *G06F 16/903*     (2019.01)
 *G06T 7/35*     (2017.01)
(52) U.S. Cl.
 CPC .......... *G06F 16/90335* (2019.01); *G06T 7/35* (2017.01); *G06T 2207/20081* (2013.01)
(58) Field of Classification Search
 CPC ................. G06F 16/90335; G06T 7/35; G06T 2207/20081
 See application file for complete search history.

(56) References Cited

U.S. PATENT DOCUMENTS 8,549,403 B2     10/2013  Sitrick
9,571,419 B2 *    2/2017  Beaty ................... H04L 47/803
(Continued)

FOREIGN PATENT DOCUMENTS

CN       104221356 A     12/2014
CN       107251026 A  * 10/2017  ......... G06F 3/04842
(Continued)

OTHER PUBLICATIONS

Nott, CycleGan for Season Transfer, May 18, 2020, https://medium.com/@viswajith.madhuram/cyclegan-for-season-transfer-61b92ba23b4b.

(Continued)

*Primary Examiner* — Charles Rones
*Assistant Examiner* — Ken Hoang
(74) *Attorney, Agent, or Firm* — Garg Law Firm, PLLC; Rakesh Garg; Michael O'Keefe

(57)     ABSTRACT

An embodiment includes analyzing a first digital image using a first trained neural network that classifies the first image as having a first context based on a plurality of characteristics of the first image. The embodiment generates a data structure that associates first and second elements depicted in the first image based on an affinity detected between the first and second elements in the first context. The embodiment executes a querying process that searches for information requested by a user, and detects that a search result from the querying process conveys a second context that is different from the first context. The embodiment identifies a third element in the data structure having an affinity with the first element in the second context. The embodiment renders a machine-generated image that is generated using a second trained neural network and depicts the first element and the third element in the second context.

20 Claims, 9 Drawing Sheets

(56) References Cited

U.S. PATENT DOCUMENTS

| | | | |
|---|---|---|---|
| 2009/0144033 A1* | 6/2009 | Liu | G06F 18/2321 |
| | | | 703/2 |
| 2010/0250581 A1* | 9/2010 | Chau | G06F 16/58 |
| | | | 707/769 |
| 2012/0236105 A1 | 9/2012 | Alberth et al. | |
| 2013/0282808 A1* | 10/2013 | Sadanandan | G06Q 10/10 |
| | | | 709/204 |
| 2014/0188786 A1* | 7/2014 | Raichelgauz | H04H 60/56 |
| | | | 707/754 |
| 2016/0301860 A1 | 10/2016 | Bostick et al. | |
| 2019/0147582 A1 | 5/2019 | Lee et al. | |
| 2019/0279075 A1 | 9/2019 | Liu et al. | |
| 2020/0228880 A1* | 7/2020 | Iyer | H04N 21/23424 |
| 2021/0004589 A1* | 1/2021 | Turkelson | G06V 30/19173 |
| 2021/0089903 A1* | 3/2021 | Murray | G06F 18/2132 |

FOREIGN PATENT DOCUMENTS

| | | |
|---|---|---|
| JP | 2002148061 A | 5/2002 |
| JP | 2002251621 A | 9/2002 |

OTHER PUBLICATIONS

Ren, How I Trained a GAN to Make It Snow, Aug. 17, 2020, https://medium.com/descarteslabs-team/how-i-trained-a-gan-to-make-it-snow-6f6cfdac4b5e.

Vincent, Nvidia uses AI to make it snow on streets that are always sunny, Dec. 5, 2017, https://www.theverge.com/2017/12/5/16737260/ai-image-translation-nvidia-data-self-driving-cars.

Porav et al., Adversarial Training for Adverse Conditions: Robust Metric Localisation Using Appearance Transfer, May 21-25, 2018, IEEE International Conference on Robotics and Automation (ICRA), pp. 1011-1018.

Shao et al., DuCaGAN: Unified Dual Capsule Generative Adversarial Network for Unsupervised Image-to-Image Translation, Aug. 26, 2020, IEEE Access, vol. 8, pp. 154691-154707.

Neubert et al., Appearance change prediction for long-term navigation across seasons, Sep. 25-27, 2013, 2013 European Conference on Mobile Robots, pp. 198-203.

Moores, How to Improve Visitor Engagement Using Weather-Based Personalization, Dec. 20, 2017, https://spinsucks.com/marketing/weather-based-personalization/.

* cited by examiner

SERVICE REGISTRY
304

IMAGE SYNTHESIS SYSTEM
306

API GATEWAY
302

USER DEVICE
308

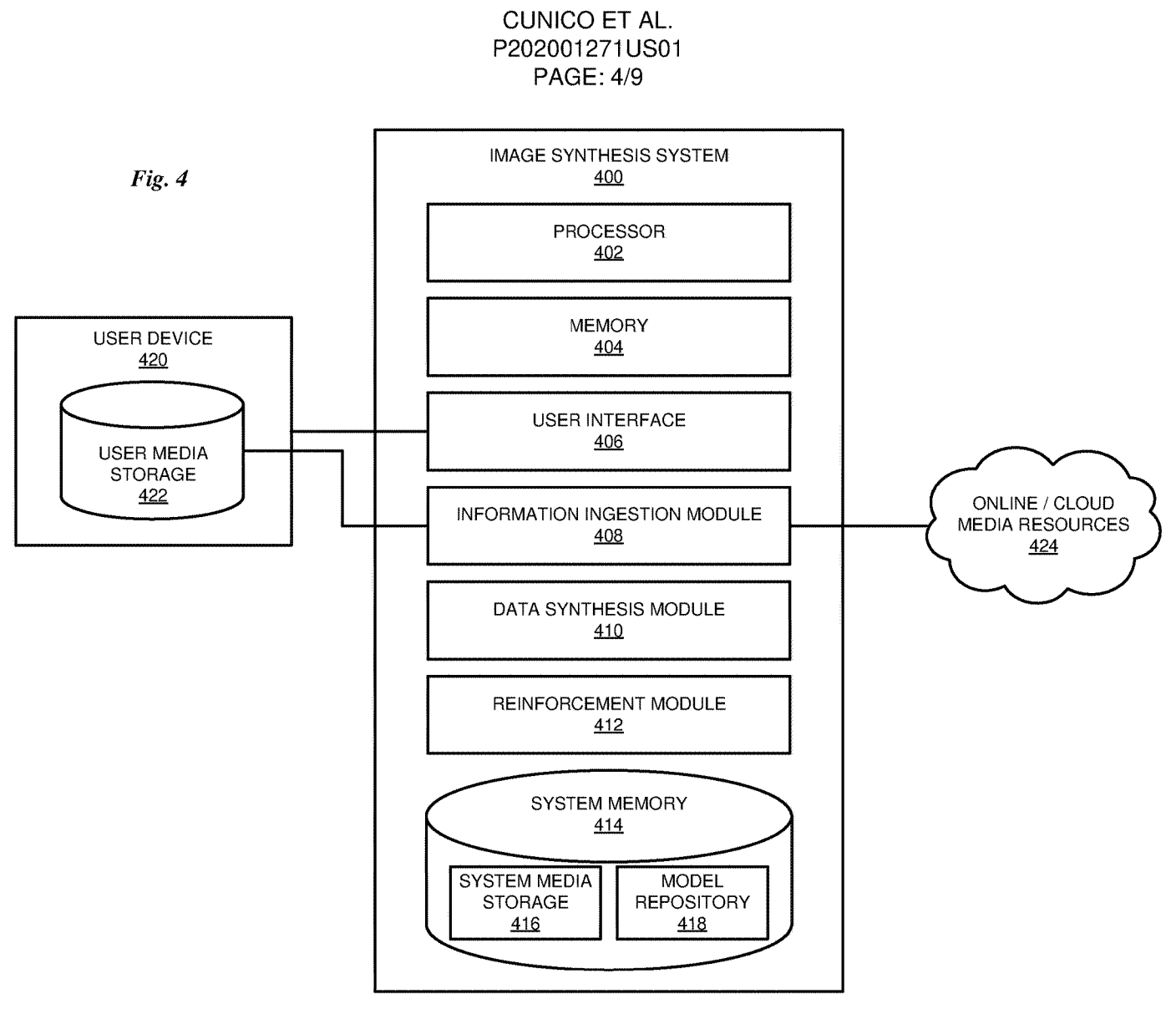

CUNICO ET AL.
P202001271US01
PAGE: 4/9

*Fig. 4*

IMAGE SYNTHESIS SYSTEM
400

PROCESSOR
402

MEMORY
404

USER INTERFACE
406

INFORMATION INGESTION MODULE
408

DATA SYNTHESIS MODULE
410

REINFORCEMENT MODULE
412

SYSTEM MEMORY
414

SYSTEM MEDIA STORAGE
416

MODEL REPOSITORY
418

ONLINE / CLOUD MEDIA RESOURCES
424

USER DEVICE
420

USER MEDIA STORAGE
422

*Fig. 9*

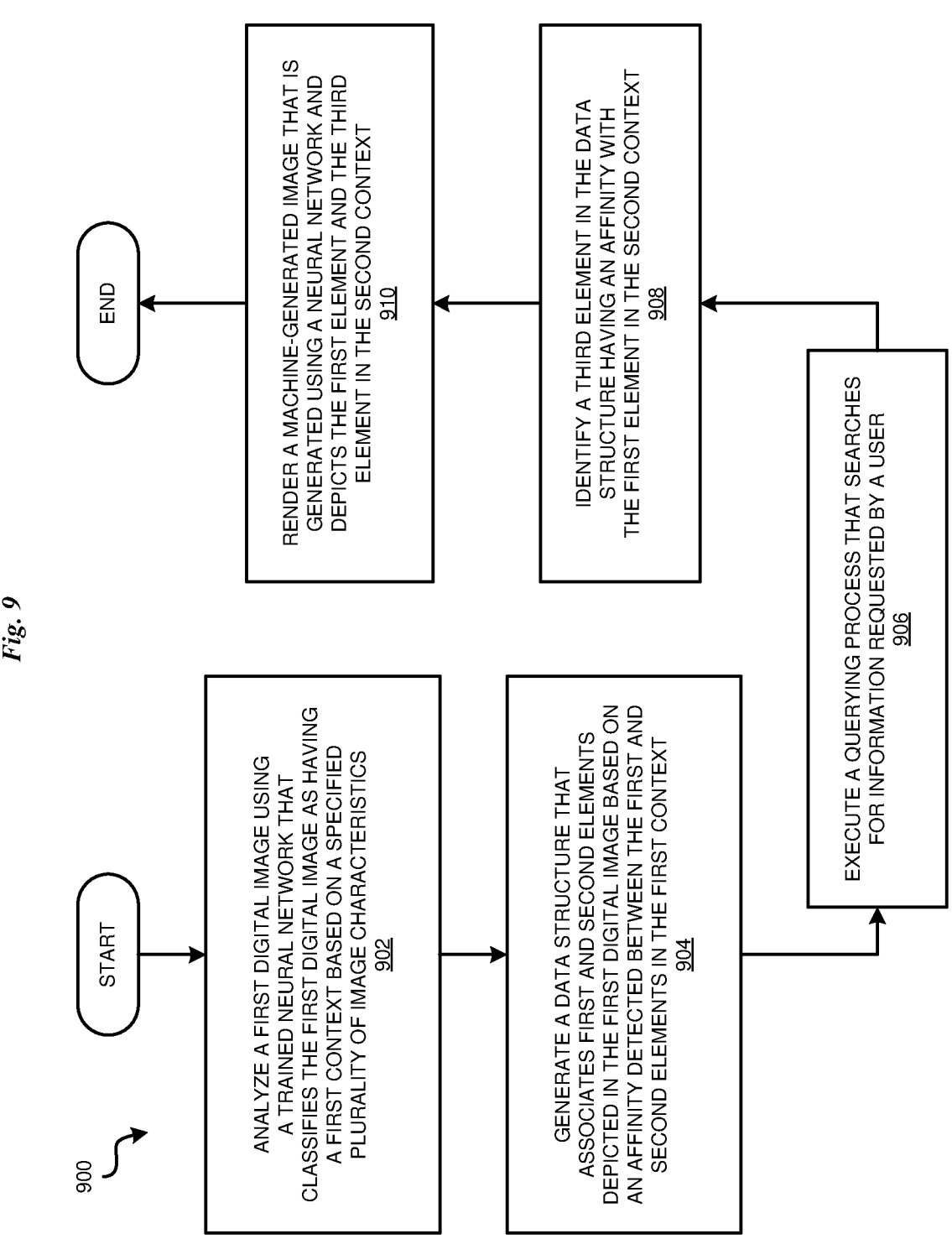

900

START

ANALYZE A FIRST DIGITAL IMAGE USING A TRAINED NEURAL NETWORK THAT CLASSIFIES THE FIRST DIGITAL IMAGE AS HAVING A FIRST CONTEXT BASED ON A SPECIFIED PLURALITY OF IMAGE CHARACTERISTICS
902

GENERATE A DATA STRUCTURE THAT ASSOCIATES FIRST AND SECOND ELEMENTS DEPICTED IN THE FIRST DIGITAL IMAGE BASED ON AN AFFINITY DETECTED BETWEEN THE FIRST AND SECOND ELEMENTS IN THE FIRST CONTEXT
904

EXECUTE A QUERYING PROCESS THAT SEARCHES FOR INFORMATION REQUESTED BY A USER
906

IDENTIFY A THIRD ELEMENT IN THE DATA STRUCTURE HAVING AN AFFINITY WITH THE FIRST ELEMENT IN THE SECOND CONTEXT
908

RENDER A MACHINE-GENERATED IMAGE THAT IS GENERATED USING A NEURAL NETWORK AND DEPICTS THE FIRST ELEMENT AND THE THIRD ELEMENT IN THE SECOND CONTEXT
910

END

IMAGE SYNTHESIS BASED ON PREDICTIVE ANALYTICS

BACKGROUND

The present invention relates generally to a method, system, and computer program product for data processing. More particularly, the present invention relates to a method, system, and computer program product for image synthesis based on predictive analytics.

Artificial intelligence (AI) technology has evolved significantly over the past few years. Modem AI systems include machine learning systems that are achieving human level performance on cognitive tasks like converting speech to text, recognizing objects and images, or translating between different languages. This evolution holds promise for new and improved applications in many industries.

Recent years have also seen a rapid increase in the use of technologies related to the internet of things (IoT), particularly in the area of devices referred to as intelligent virtual assistant (IVA) or intelligent personal assistant (IPA) devices. Advances in AI have improved the performance of intelligent IoT devices, allowing for better voice recognition and better ability to convert user inputs into actionable data. For example, advances in context recognition have led to improved capabilities for generating search queries and providing relevant informative in response to a question posed by a user.

SUMMARY

The illustrative embodiments provide for image synthesis based on predictive analytics. An embodiment includes analyzing a first digital image using a first trained neural network that classifies the first digital image as having a first context based on a plurality of characteristics of the first digital image, where each of the plurality of characteristics corresponds to a respective category of a specified plurality of characteristic categories. The embodiment also includes generating a data structure that associates first and second elements depicted in the first digital image based on an affinity detected between the first and second elements in the first context. The embodiment also includes executing a querying process that searches for information requested by a user. The embodiment also includes detecting that a search result from the querying process conveys a second context that is different from the first context. The embodiment also includes identifying a third element in the data structure having an affinity with the first element in the second context. The embodiment also includes rendering a machine-generated digital image that is generated using a second trained neural network and depicts the first element and the third element in the second context. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example service infrastructure that includes an image synthesis system in accordance with an illustrative embodiment;

FIG. 4 depicts a block diagram of an example image synthesis system in accordance with an illustrative embodiment;

FIG. 9 depicts a flowchart of an example process for image synthesis based on predictive analytics in accordance with an illustrative embodiment.

DETAILED DESCRIPTION

Figure 1:
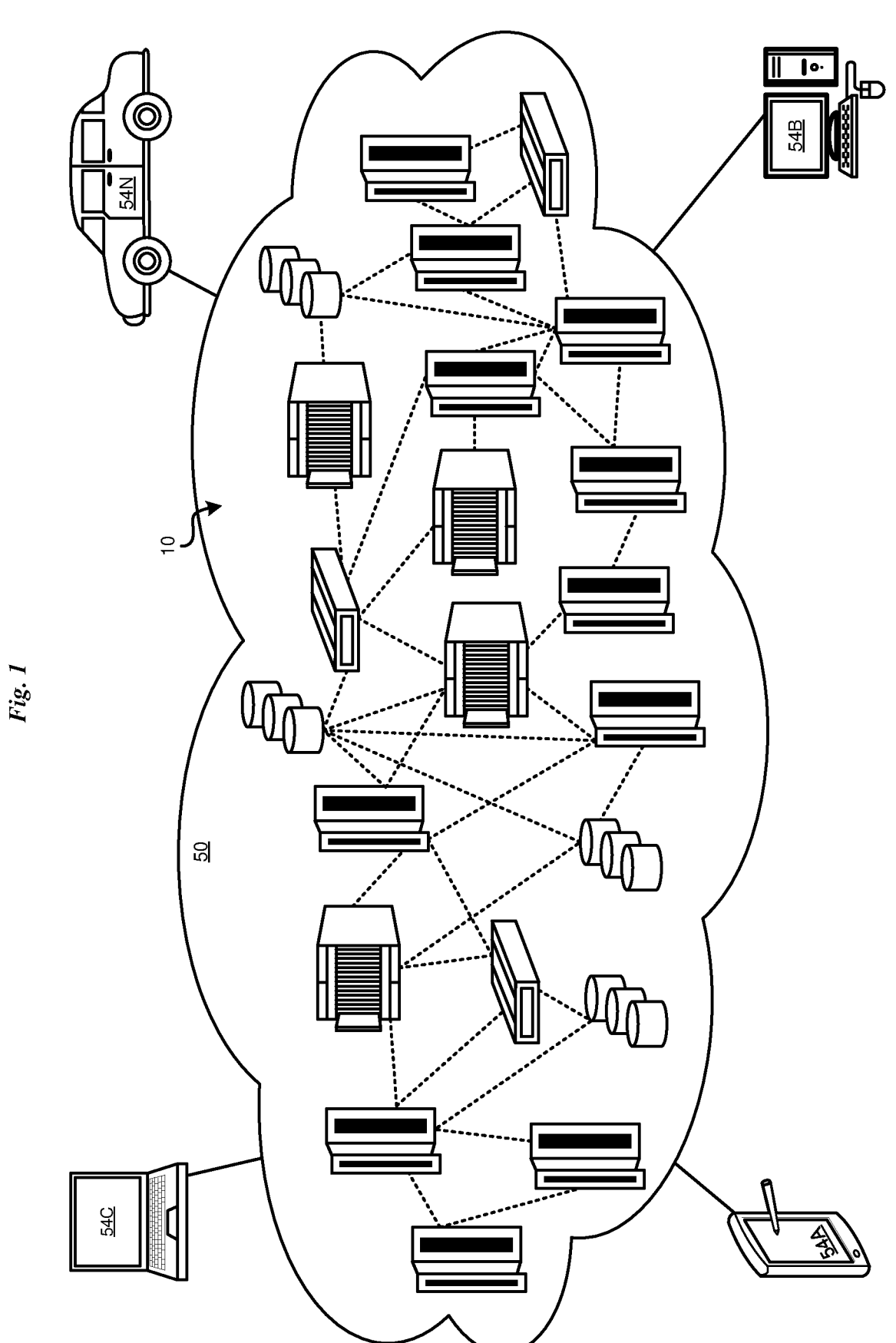
FIG. 1 depicts a cloud computing environment according to an embodiment of the present invention.

User's like to see personalized images being displayed in their IoT or other linked devices, ranging from IPA or IVA devices, to smartphones or even laptop screensavers. Usually, either a random image can be displayed as screensaver or, if authorized by the user, personal images maybe fetched from a device's memory or from the user's online accounts, such as social media or online image gallery accounts.

However, these options present only very limited personalization options for the user, as the images presented are selected but unchanged from the user's image collection or from other image sources. Users seeking a truly personalized experience are therefore limited in their options. For example, users that would prefer to see customized images that present contextually relevant information must create such images manually, which can be a technically challenging process. Similarly, businesses seeking imagery that is contextually relevant, for example that is correlated to environmental conditions such as current or upcoming weather conditions, must generate such images manually. This can be a time-consuming process, and may lead to missed sales opportunities that could be captured if such imagery could be automatically generated dynamically and used for marketing and advertising.

Aspects of the present disclosure address the deficiencies described above by providing mechanisms (e.g., systems, methods, machine-readable media, etc.) that generate visuals in correlation with user's contextual attributes based on deriving predictive analytics. In some embodiments, certain images may be generated based on external surroundings that are taken into consideration, which may involve predicting such things as variations in weather and embedding such representations with a user's existing images to generate new custom images that suit an overall context. In some such embodiments, Generative Adversarial Networks may be used with the ability and authorization to retrieve a user's images from local or remote sources, index the images, and generate visually appealing custom images that can be presented to the user and include visually relevant customizations based on the user's context, such as weather conditions, traffic conditions, time of day or year, upcoming holidays or vacations, or other contexts.

In illustrative embodiments, AI-driven systems and methods are disclosed for generating custom images in correlation with user's contextual attributes based on derived predictive analytics of external drivers. Some such embodiments include dynamically tagging and labeling a user's library of visual content (photos) based on context and external drivers. Some such embodiments include modelling pairing elements and their dependency within a picture by ingesting weather, calendar, location, and other data points as external drivers for context prediction from which to generate the customized images.

In an illustrative embodiment, the method includes data-driven information ingestion, data synthesis, and context reinforcement. In some embodiments, data-driving information ingestion includes identifying content sources and deriving an understanding of semantic information within each piece of content. In some embodiments, the method includes analyzing media sources where the user stores content, such as images and videos (sometimes collectively referred herein to as images), subject to permission being granted by the user to access such sources, for example local storage, social media accounts, cloud storage, etc. In some embodiments, the method includes using deep autoencoder known techniques to analyze and categorize each image and video file. In some embodiments, this categorization may include, but is not limited to, the following elements:

a. Source
b. People identification
c. Objects identification
d. Derived activity
e. Geospatial data
f. Time and date
g. Derived environmental conditions In some embodiments, the method includes creating a data structure in the form of Element Pairing Models (EPM) with probabilistic representations of combinations of each of the elements identified in the images. In some such embodiments, the method uses a combination of eigenvectors and Barnard's test to derive affinity between elements, and use a Gaussian Mixture Model (GMM) to cluster the elements.

In some embodiments, the data synthesis aspect of the method uses the EPM as input to a GAN that generates variations of certain elements depending on their affinity. For the sake of simplicity, a non-limiting example of one element the EPM includes derived environmental conditions, such as winter conditions. In this example, the GAN may evaluate an image and determine that the image does not correspond with the derived environmental conditions, for example the image depicts an outdoor scene that would more likely be associated with summer conditions based on green vegetation, blooming flowers, full trees, etc. The probabilistic combination provided by the EPM allows for a "winter" variation, so the method generates a snow-covered variation of the image.

Other examples would include generating a variation of one element in a known pair association. Table 1 some sample values:

TABLE 1

|  | Picture 1 | Picture 2 | Picture 3 | Picture 4 |
| --- | --- | --- | --- | --- |
| Element A | Peter | Mary | Peter | Mary |
| Element B | Jacket1 | Coat1 | Jacket2 | T-shirt |
| Element C | Winter | Winter | Fall | Summer |
| Element D | Mountains | Mountains | Road | Beach |

There might be other pictures with Peter and Mary together. The point of Table 1 is to illustrate that Element B belongs to Element A in the context of Element C. For example, elements A and A' may be combined (without variation) in a compatible, machine-generated image that includes a new machine generated Element D, where the new machine-generated image includes the elements shown in Table 2:

TABLE 2

|  | Generated Image |
| --- | --- |
| Element A | Peter |
| Element A' | Mary |
| Element B | Jacket1 |
| Element B' | Coat1 |
| Element C | Winter |
| Element D | Mountain Road |

As another example, element B may be replaced with a generated version of an element, for example a generated version of "Jacket 2" and put in the frame set elements C and D from Picture 1 in Table 1, resulting in a new machine-generated image that includes the elements shown in Table 3:

TABLE 3

|  | Generated Image |
| --- | --- |
| Element A | Peter |
| Element B | Jacket2 |
| Element C | Winter |
| Element D | Mountain |

In some embodiments, the context reinforcement aspect of the method includes a conditional external driver that will steer the image generation process and presentation to the user. For example, this aspect of the method may include receiving a request for information from a user, such as the weather forecast. In response, the method includes displaying the weather forecast and choosing, as background image to be displayed with the forecast, a machine-generated representative image, where the image includes a depiction of the user who made the request with other imagery consistent with the weather forecast and/or the location of the forecast. For example, if the user is vacationing near mountains and the forecast includes snow, the method may include depicting, as the background image, a machine-generated image of the user in a machine-generated snowed-mountain landscape. In some embodiments, the method may further generate a second image layer corresponding to the user's apparel. For example, if the user were wearing summer clothing in the original image, the user's winter clothing from another image may be used as a second layer that is added as an overlay to give the appearance that the user is now wearing the winter apparel in the machine-generated image. In some embodiments, the method may include modifying the background composite to include machine-generated clouds, rain, and/or other elements that correspond to the external driver (e.g., the weather conditions).

In illustrative embodiments, an image synthesis method comprises analyzing a digital image using a trained neural network that classifies the digital image as having a certain context based on a plurality of characteristics of the digital image. In some such embodiments, the method correlates each of the plurality of characteristics with a respective category of a specified plurality of characteristic categories. In some such embodiments, the trained neural network is included in an encoder network of a deep autoencoder that further comprises a decoder network. In some such embodiments, the encoder network comprises a plurality of input nodes for receiving image data and the decoder network comprises a plurality of output nodes for outputting contextual information or a context classification.

In illustrative embodiments, an image synthesis method generates a data structure that associates elements depicted in the digital image based on an affinity detected between the elements in a certain context. In some such embodiments, the method includes fitting a first Gaussian mixture model (GMM) to pixels of one element in the digital image, fitting a second GMM to pixels of another element in the digital image, and detecting an affinity between these elements based on a degree of similarity between the first GMM and the second GMM.

In illustrative embodiments, an image synthesis method executes a querying process that searches for information requested by a user. In some such embodiments, a type of the information requested by the user may include such things as weather information, traffic information, and event information. In some embodiments, the method includes detecting that a search result from the querying process conveys a certain context. In some such embodiments, the method includes detecting that the search result includes at least one characteristic corresponding to one of the specified plurality of characteristic categories.

In some such embodiments, the method includes identifying an element in the generated data structure that has an affinity with an element in one of the user's images in the certain context associated with the search result. In some such embodiments, the method comprises generating the machine-generated digital image using a Generative Adversarial Network (GAN) that comprises a trained neural network. In some such embodiments, the GAN comprises a generator and a discriminator, where the generator includes trained neural network as a generator neural network, and the discriminator includes another trained neural network as a discriminator neural network. In some such embodiments, the method includes training the discriminator neural network of the GAN based on training data input to the discriminator neural network that comprises actual digital images and machine-generated digital images generated by the generator neural network of the GAN.

In some such embodiments, the method includes training the generator neural network of the GAN to generate machine-generated digital images approximating actual digital images. In some such embodiments, the training of the generator neural network comprises receiving, by the generator neural network of the GAN, actual digital images and inputting, by a noise generator, a noise input to the generator neural network, then generating, by the generator neural network, machine-generated digital images based on combinations of the actual digital images and the noise input, then providing the actual digital images and the machine-generated digital images to the discriminator neural network of the GAN. The training then includes analyzing, by the discriminator neural network, the actual digital images and the machine-generated digital images, and trying to predict which images are actual images and which are machine-generated images. These predictions are fed back to the generator, which modifies operational parameters based on the feedback in an attempt to generate machine-generated images that the discriminator will classify as actual digital images.

In illustrative embodiments, the method uses the trained GAN to render a machine-generated digital image for the context associated with the search results. In some such embodiments, the machine-generated image depicts both an element from an actual image and another element, either from another image or that is a machine-generated element, where the elements are determined to have an affinity in the context associated with the search results.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, training data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
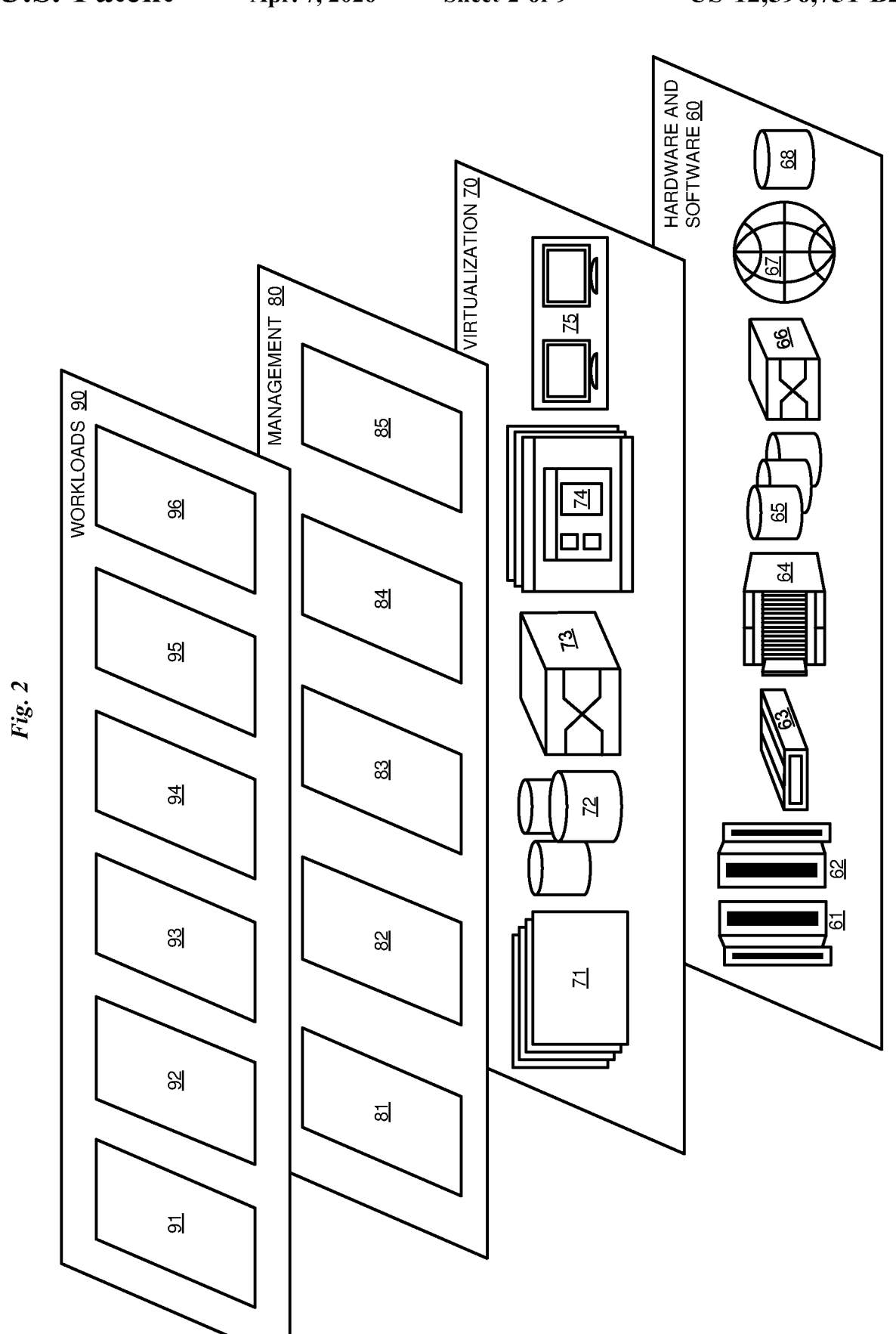
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing

94; transaction processing 95; and in the context of the illustrated embodiments of the present disclosure, various workloads and functions 96 for image synthesis based on predictive analytics. In addition, workloads and functions 96 for image synthesis based on predictive analytics may include such operations as data analysis and machine learning (e.g., artificial intelligence, natural language processing, etc.), as described herein. In some embodiments, the workloads and functions 96 for image synthesis based on predictive analytics also works in conjunction with other portions of the various abstractions layers, such as those in hardware and software 60, virtualization 70, management 80, and other workloads 90 (such as data analytics processing 94, for example) to accomplish the various purposes of the disclosed embodiments.

Figure 3:
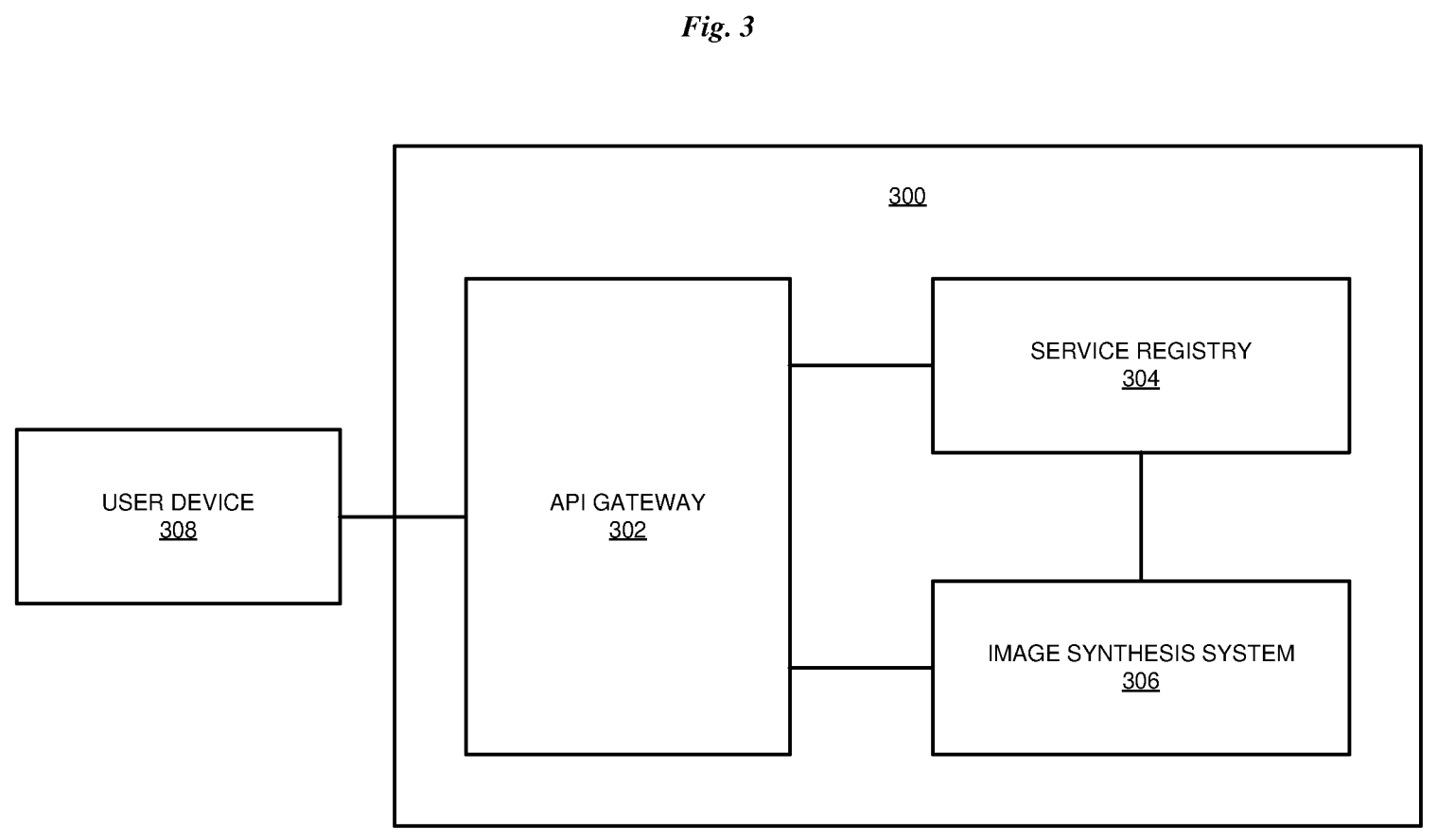

With reference to FIG. 3, this figure depicts a block diagram of an example service infrastructure 300 that includes an image synthesis system 306 in accordance with an illustrative embodiment. In some embodiments, the image synthesis system 306 is deployed in workloads layer 90 of FIG. 2. By way of example, in some embodiments, image synthesis system 306 is implemented as machine learning processing 96 in FIG. 2.

In the illustrated embodiment, the service infrastructure 300 provides services and service instances to a user device 308. User device 308 communicates with service infrastructure 300 via an API gateway 302. In various embodiments, service infrastructure 300 and its associated image synthesis system 306 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 308 connects with API gateway 302 via any suitable network or combination of networks such as the Internet, etc. and uses any suitable communication protocols such as Wi-Fi, Bluetooth, etc. Service infrastructure 300 may be built on the basis of cloud computing. API gateway 302 provides access to client applications like image synthesis system 306. API gateway 302 receives service requests issued by client applications, and creates service lookup requests based on service requests. As a non-limiting example, in an embodiment, the user device 308 is an IoT device, such as a PVA or IVA, a smartphone, a laptop, or other computing device that displays images.

In the illustrated embodiment, service infrastructure 300 includes a service registry 304. In some embodiments, service registry 304 looks up service instances of image synthesis system 306 in response to a service lookup request such as one from API gateway 302 in response to a service request from user device 308. For example, in some embodiments, the service registry 304 looks up service instances of image synthesis system 306 in response to requests from the user device 308 related to synthesis of a machine-generated image.

In some embodiments, the service infrastructure 300 includes one or more instances of the image synthesis system 306. In some such embodiments, each of the multiple instances of the image synthesis system 306 run independently on multiple computing systems. In some such embodiments, image synthesis system 306, as well as other service instances of image synthesis system 306, are registered in service registry 304.

In some embodiments, service registry 304 maintains information about the status or health of each service instance including performance information associated each of the service instances. For example, such performance information may include several types of performance characteristics of a given service instance (e.g., cache metrics, etc.). In some embodiments, the extended service registry 304 ranks service instances based on their respective performance characteristics, and selects top-ranking service instances for classification requests. In some such embodiments, in the event that a service instance becomes unresponsive or, unhealthy, the service registry will no longer provide its address or information about this service instance to other services.

With reference to FIG. 4, this figure depicts a block diagram of an example image synthesis system 400 in accordance with an illustrative embodiment. In a particular embodiment, the image synthesis system 400 is an example of the workloads and functions 96 for image synthesis processing of FIG. 1. In alternative embodiments, the image synthesis system 400 is an application or module that operates on a user's computing device rather than in a remote computing environment.

In some embodiments, the image synthesis system 400 includes a processor 402, memory 404, a user interface 406, an information ingestion module 408, a data synthesis module 410, a reinforcement module 412, and system memory 414 that includes system media storage 416 and a model repository 418. In alternative embodiments, the image synthesis system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the image synthesis system 400 includes a processing unit ("processor") 402 to perform various computational and data processing tasks, as well as other functionality. The processing unit 402 is in communication with memory 404. In some embodiments, the memory 404 comprises one or more computer readable storage media with program instructions collectively stored on the one or more computer readable storage media, with the program instructions being executable by one or more processors 402 to cause the one or more processors 402 to perform operations described herein.

The image synthesis system 400 includes a user interface 406, which may include a graphic or command line interface that allows a user to communicate with the image synthesis system 400 using a user device 420. For example, in some embodiments, the user interface 406 is configured to recognize and take action in response to requests from the user device 420 related to synthesis of a machine-generated image. In some embodiments, the user device 420 may be any known type of computing device, such as an IoT device, a computer, tablet, or smart phone. In some embodiments, the user interface 406 allows communication with the user device 420 via an API gateway (e.g., API gateway 302 of FIG. 3).

In some embodiments, the user interface 406 and the information ingestion module 408 receive one or more bodies of text, images, video frames, or other content from the user media storage 422 of the user device 420 for use in the disclosed image synthesis processes. In some embodiments, the information ingestion module 408 further receive one or more bodies of text, images, video frames, or other content from other online or cloud-based media resources

424, such as social media accounts, cloud storage, etc., subject to authorization being granted by the user.

In some embodiments, the information ingestion module 408 identifies content sources and derives an understanding of semantic information within each piece of content. In some embodiments, the information ingestion module 408 analyzes media sources where the user stores content, such as images and videos (sometimes collectively referred herein to as images), subject to permission being granted by the user to access such sources, for example local storage, social media accounts, cloud storage, etc. In some embodiments, the information ingestion module 408 uses deep autoencoder known techniques to analyze and categorize each image and video file. In some embodiments, this categorization may include, but is not limited to, the following elements:

a. Source
    b. People identification
    c. Objects identification
    d. Derived activity
    e. Geospatial data
    f. Time and date
    g. Derived environmental conditions In some embodiments, the information ingestion module 408 creates a data structure in the form of Element Pairing Models (EPM) with probabilistic representations of combinations of each of the elements identified in the images. In some such embodiments, the information ingestion module 408 uses a combination of eigenvectors and Barnard's test to derive affinity between elements, and use a Gaussian Mixture Model (GMM) to cluster the elements.

In some embodiments, the data synthesis module 410 uses the EPM as input to a GAN that generates variations of certain elements depending on their affinity. For the sake of simplicity, a non-limiting example of one element the EPM includes derived environmental conditions, such as winter conditions. In this example, the GAN may evaluate an image and determine that the image does not correspond with the derived environmental conditions, for example the image depicts an outdoor scene that would more likely be associated with summer conditions based on green vegetation, blooming flowers, full trees, etc. The probabilistic combination provided by the EPM allows for a "winter" variation, so the method generates a snow-covered variation of the image.

In some embodiments, the reinforcement module 412 applies conditional external drivers to steer the image generation process and presentation to the user. For example, in some embodiments, the image synthesis system 400 receives a request for information from a user, such as the weather forecast. In response, the image synthesis system 400 generates or renders a display that includes the weather forecast and a background image. In some such embodiments, the reinforcement module 412 steers the choice of a background image to be a machine-generated representative image consistent with the forecast requested by the user. For example, the reinforcement module 412 will steer the process to provide and image that includes a depiction of the user who made the request with other imagery consistent with the weather forecast and/or the location of the forecast.

Figure 5:
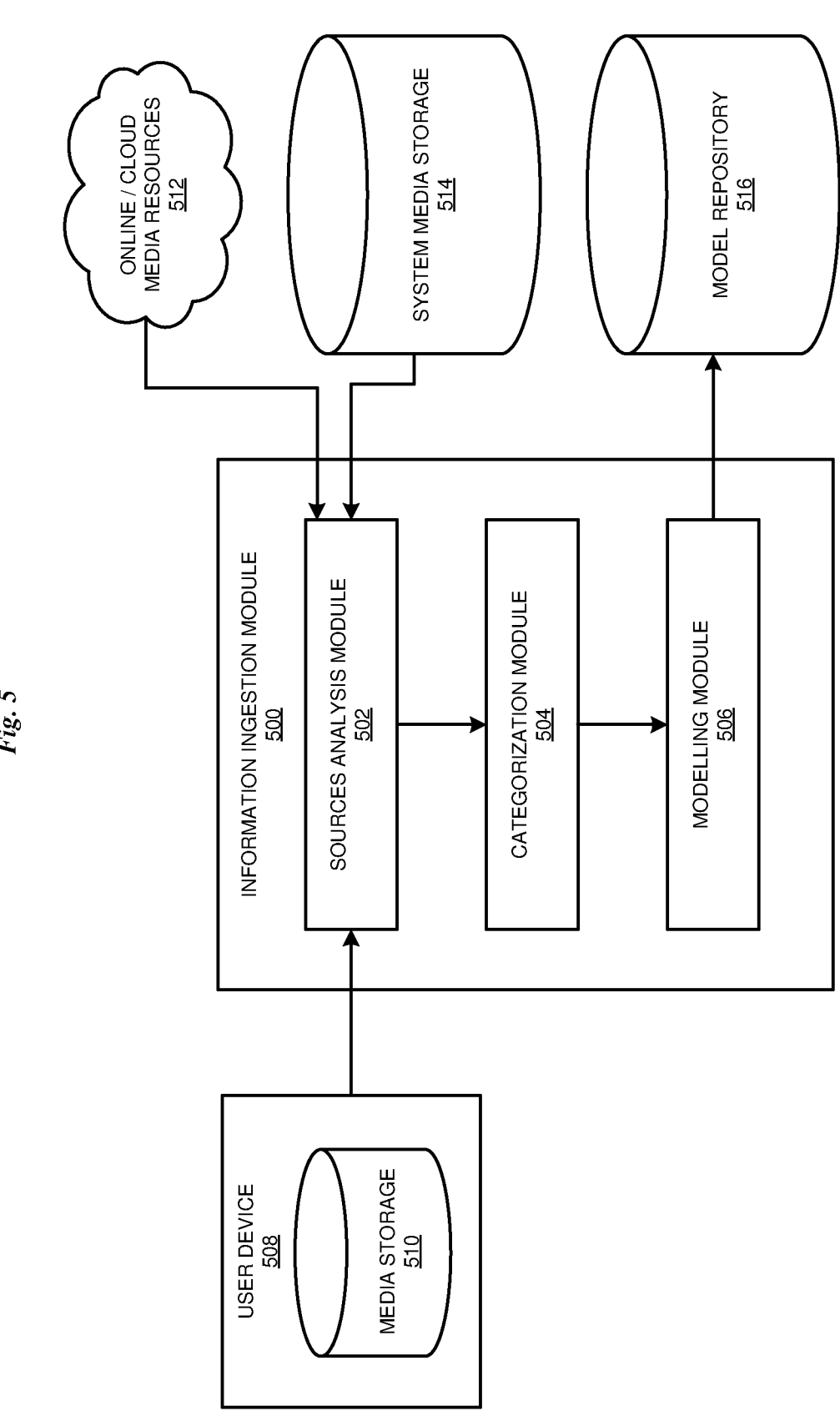
FIG. 5 depicts a block diagram of an example information ingestion module in accordance with an illustrative embodiment.

With reference to FIG. 5, this figure depicts a block diagram of an example information ingestion module 500 in accordance with an illustrative embodiment. In a particular embodiment, the information ingestion module 500 is an example of the information ingestion module 408 of FIG. 4.

In some embodiments, the information ingestion module 500 includes a sources analysis module 502, a categorization module 504, and a modelling module 506. In alternative embodiments, the information ingestion module 500 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the sources analysis module 502 identifies content sources and derives an understanding of semantic information within each piece of content. In some embodiments, the sources analysis module 502 analyzes media sources where the user stores content, such as images and videos (sometimes collectively referred herein to as images), subject to permission being granted by the user to access such sources, for example media storage 510 on the user device 508, local system media storage 514, and online or cloud-based media resources 512, such as social media accounts, cloud storage, etc., subject to authorization being granted by the user.

In some embodiments, the categorization module 504 uses deep autoencoder known techniques to analyze and categorize each image and video file. In some embodiments, this categorization may include, but is not limited to, the following elements:

a. Source
  b. People identification
  c. Objects identification
  d. Derived activity
  e. Geospatial data
  f. Time and date
  g. Derived environmental conditions In some embodiments, the categorization module 504 analyzes a digital image using a trained neural network that classifies the digital image as having a certain context based on a plurality of characteristics of the digital image. In some such embodiments, the categorization module 504 correlates each of the plurality of characteristics with a respective category of a specified plurality of characteristic categories. In some such embodiments, the trained neural network is included in an encoder network of a deep autoencoder that further comprises a decoder network. In some such embodiments, the encoder network comprises a plurality of input nodes for receiving image data and the decoder network comprises a plurality of output nodes for outputting contextual information or a context classification.

In some embodiments, the modelling module 506 creates a data structure in the form of Element Pairing Models (EPM) with probabilistic representations of combinations of each of the elements identified in the images. In some such embodiments, the modelling module 506 uses a combination of eigenvectors and Barnard's test to derive affinity between elements, and use a Gaussian Mixture Model (GMM) to cluster the elements. In some embodiments, the modelling module 506 stores the data structure in a local or remote model repository 516.

In some embodiments, the modelling module 506 generates a data structure that associates elements depicted in the digital image based on an affinity detected between the elements in a certain context. In some such embodiments, the method includes fitting a first Gaussian mixture model (GMM) to pixels of one element in the digital image, fitting a second GMM to pixels of another element in the digital image, and detecting an affinity between these elements based on a degree of similarity between the first GMM and the second GMM.

Figure 6:
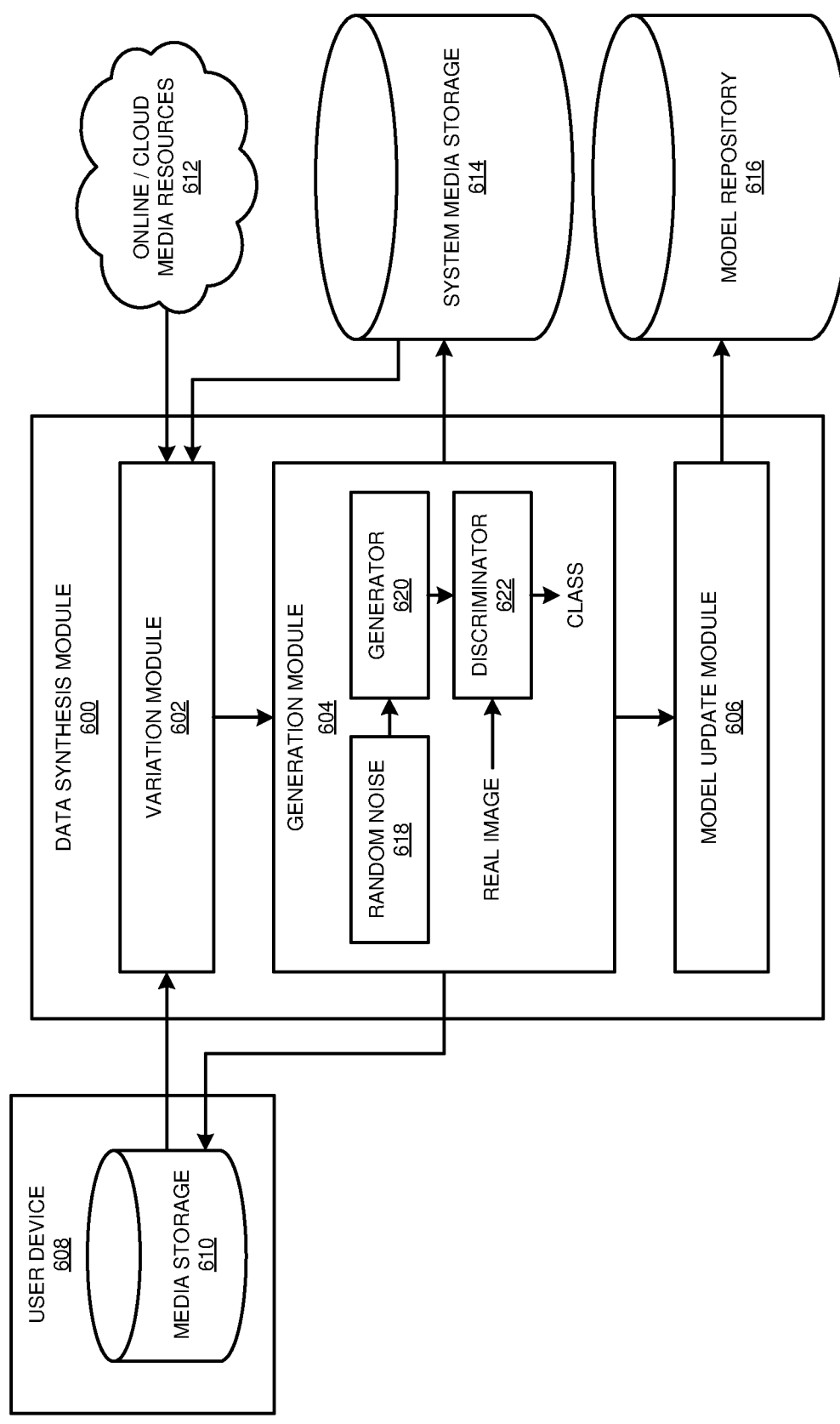
FIG. 6 depicts a block diagram of an example data synthesis module in accordance with an illustrative embodiment.

With reference to FIG. 6, this figure depicts a block diagram of an example data synthesis module 600 in accordance with an illustrative embodiment. In a particular embodiment, the data synthesis module 600 is an example of the data synthesis module 410 of FIG. 4.

In some embodiments, the data synthesis module 600 includes a variation module 602, a generation module 604, and a model update module 606. In alternative embodiments, the data synthesis module 600 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the variation module 602 uses the EPM as input to a GAN that generates variations of certain elements depending on their affinity. For the sake of simplicity, a non-limiting example of one element the EPM includes derived environmental conditions, such as winter conditions. In this example, the GAN may evaluate an image and determine that the image does not correspond with the derived environmental conditions, for example the image depicts an outdoor scene that would more likely be associated with summer conditions based on green vegetation, blooming flowers, full trees, etc. The probabilistic combination provided by the EPM allows for a "winter" variation, so the method generates a snow-covered variation of the image. In some such embodiments, the model update module 606 adds new variations to the EPM by updating the EPM in the model repository 616. In some embodiments, the variation module 602 identifies an element in the generated data structure that has an affinity with an element in one of the user's images in the certain context associated with the search result.

In some such embodiments, the generation module 604 generates a machine-generated digital image using a Generative Adversarial Network (GAN) that comprises a generator 620 and a discriminator 622, where the generator includes a trained neural network as a generator neural network, and the discriminator includes another trained neural network as a discriminator neural network.

In some such embodiments, the generation module 604 trains the discriminator neural network of the GAN based on training data input to the discriminator neural network that comprises actual digital images and machine-generated digital images generated by the generator neural network of the GAN. In some such embodiments, the generation module 604 trains the generator neural network of the GAN to generate machine-generated digital images approximating actual digital images. In some such embodiments, the training of the generator neural network comprises receiving, by the generator neural network of the GAN, actual digital images and inputting, by a noise generator 618, a noise input to the generator neural network 620, then generating, by the generator neural network 6220, machine-generated digital images based on combinations of the actual digital images and the noise input, then providing the actual digital images and the machine-generated digital images to the discriminator neural network 622 of the GAN. The training then includes analyzing, by the discriminator neural network 622, the actual digital images and the machine-generated digital images, and trying to predict which images are actual images and which are machine-generated images. These predictions are fed back to the generator 620, which modifies operational parameters based on the feedback in an attempt to generate machine-generated images that the discriminator 622 will classify as actual digital images.

In illustrative embodiments, the generation module 604 uses the trained GAN to render a machine-generated digital image for the context associated with the search results. In some such embodiments, the machine-generated image depicts both an element from an actual image and another element, either from another image or that is a machine-generated element, where the elements are determined to have an affinity in the context associated with the search results.

Figure 7:
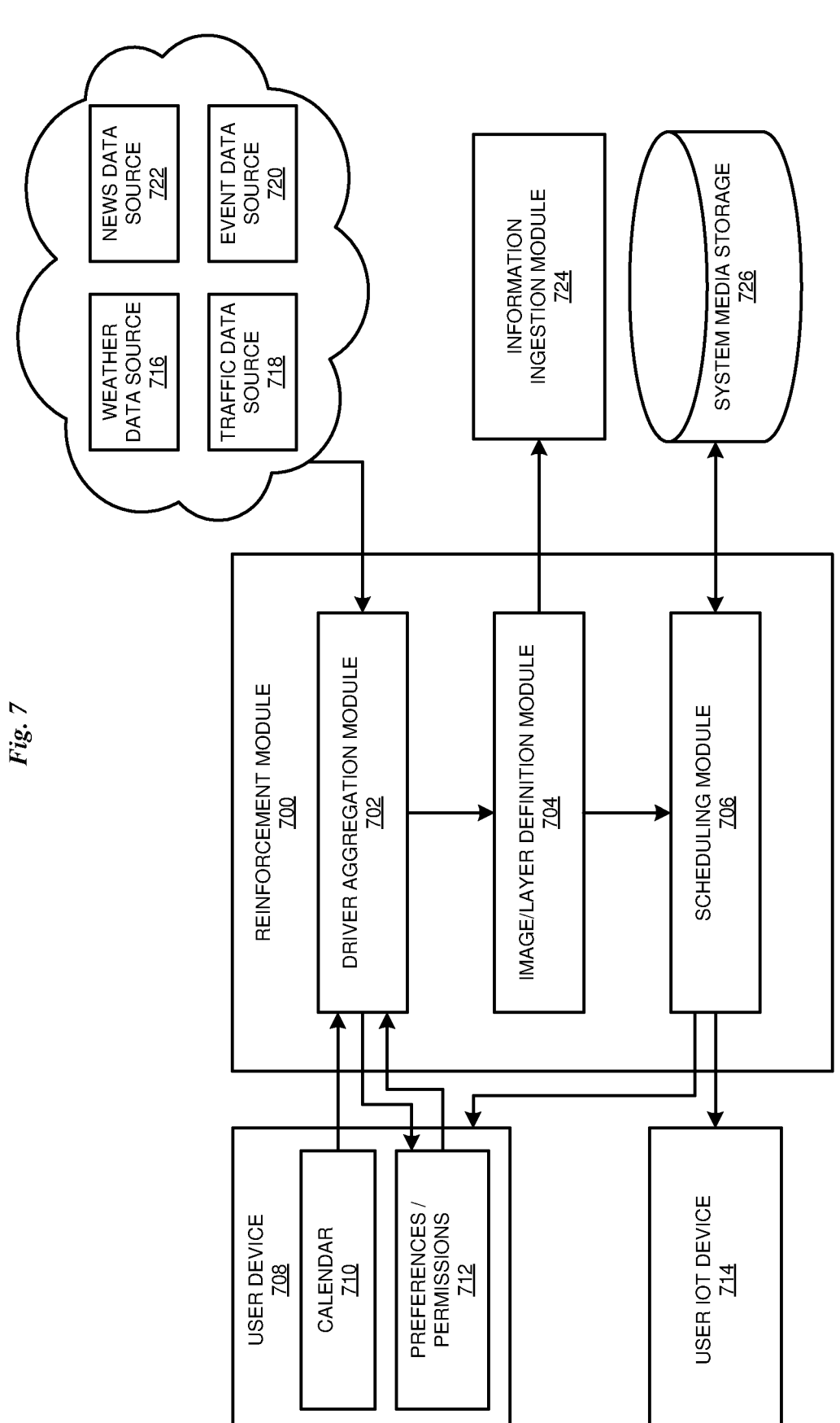
FIG. 7 depicts a block diagram of an example reinforcement module in accordance with an illustrative embodiment.

With reference to FIG. 7, this figure depicts a block diagram of an example reinforcement module 700 in accordance with an illustrative embodiment. In a particular embodiment, the reinforcement module 700 is an example of the reinforcement module 412 of FIG. 4.

In some embodiments, the reinforcement module 700 includes a driver aggregation module 702, an image/layer definition module 704, and a scheduling module 706. In alternative embodiments, the reinforcement module 700 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the driver aggregation module 702 executes a querying process that searches for information requested by a user. In some such embodiments, a type of the information requested by the user may include such things as weather information, traffic information, and event information. In some embodiments, the driver aggregation module 702 searches various resources as appropriate for the particular query. Such resources may include online resources, such as weather data sources 716, traffic data sources 718, event data sources 720, and news data sources 722, and on the user device 708, such as a calendar 710, subject to permissions and/or preferences 712 granted by the user.

In some embodiments, the layer definition module 704 detects that a search result from the querying process conveys a certain context. This context will be used as a driver for context reinforcement to steer the image synthesis process.

Figure 8:
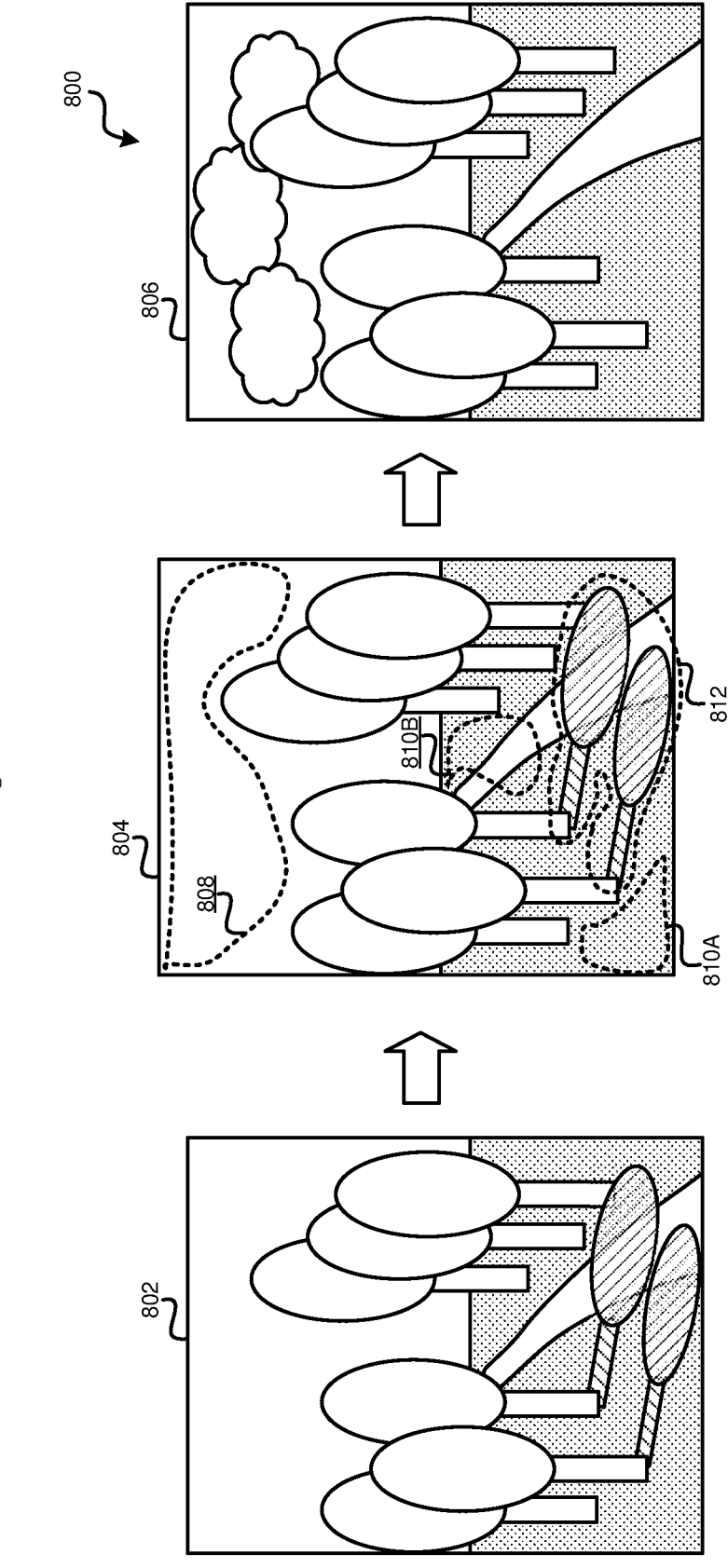
FIG. 8 depicts a block diagram of an image synthesis process in accordance with an illustrative embodiment.

For example, referring now also to FIG. 8, which illustrates an image synthesis process 800 according to disclosed embodiments at a high level, suppose the request for information from a user was a request for a weather forecast. In response, the forecast will be displayed with a background image that is a machine-generated image representative of the forecast. For example, if the forecast includes snow, the generation module 604 of FIG. 6 may begin with a user's original image 802 that depicts an outdoor scene relevant to the user but with summer conditions. The generation module 604 identifies elements of the image that have a summer context at 804, such as a clear sky 808, green vegetation at 810A and 810B, and shadows of the trees at 812 indicative of sunny conditions. The generation module 604 replaces these regions of the image with machine-generated imagery that is associated with a winter context, so that in the final image 806, the sky 808 is cloudy, the green landscape areas 810A and 810B are now snow-covered areas, and the shadow areas 812 no longer appear, consistent with cloudy conditions.

Referring again to FIG. 7, in some such embodiments, the layer definition module 704 detecting that the search result includes at least one characteristic corresponding to one of the specified plurality of characteristic categories. The layer definition module 704 then provides this context information back to the information ingestion module 724, which is an example of the information ingestion module 500 of FIG. 5.

In some embodiments, the reinforcement module 700 further includes a scheduling module 706. In some embodiments, the scheduling module 706 determines a time and duration for displaying images, including images generated by the disclosed image synthesis techniques, on a user IoT device 714 or other user device 708. For example, the scheduling module 706 may display a particular image from the system media storage 726 that was generated by the disclosed image synthesis techniques with a morning alarm or itinerary for the day, or with a calendar display that the user has schedules at particular times of the day depicting upcoming events or travel plans.

With reference to FIG. 9, this figure depicts a flowchart of an example process 900 for image synthesis based on predictive analytics in accordance with an illustrative embodiment. In a particular embodiment, the image synthesis system 306 or image synthesis system 400 carries out the process 900.

In an embodiment, at block 902, the process analyzes a first digital image using a trained neural network that classifies the first digital image as having a first context based on a specified plurality of image characteristics. Next, at block 904, the process generates a data structure that associates first and second elements depicted in the first digital image based on an affinity detected between the first and second elements in the first context. Next, at block 906, the process executes a querying process that searches for information requested by a user. In some embodiments, the process detects that a search result from the querying process conveys a second context that is different from the first context. Next, at block 908, the process identifies a third element in the data structure having an affinity with the first element in the second context. Next, at block 910, the process renders a machine-generated image that is generated using a neural network and depicts the first element and the third element in the second context.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
ingesting a plurality of external drivers usable for predicting a plurality of external contexts;
dynamically tagging a set of digital images in a library with labels based on the plurality of external drivers;
analyzing a first digital image in the library using a first trained neural network that classifies the first digital image as having a first context based on a first plurality of characteristics of the first digital image, wherein each of the first plurality of characteristics corresponds to a respective category of a specified plurality of characteristic categories;
generating a data structure that associates first and second elements depicted in the first digital image based on an affinity detected between the first and second elements in the first context, wherein the data structure further includes a plurality of pairs of elements of the first digital image, wherein each of the plurality of pairs of elements is tagged in the data structure with at least one of the plurality of external contexts;
executing a querying process that searches for information requested by a user;
detecting that a search result from the querying process conveys a second context that is different from the first context, wherein the second context is one of the plurality of external contexts according to a specific external driver in the plurality of external drivers;
synthesizing in the data structure a variation of the second element using the specific external driver to form a third element such that the third element has an affinity with the first element in the second context; and
rendering a machine-generated digital image that is generated using a second trained neural network and depicts the first element and the third element in the second context by replacing a region of the first digital image having the first plurality of characteristics associated with the first context with a second plurality of characteristics associated with the second context; and
returning, upon a determination that the machine-generated digital image corresponds with a derived environmental condition, to the user the information requested by the user combined with the machine-generated digital image, wherein the machine-generated digital image further comprises a second image layer overlaying the third element on the first element according to the second context.

2. The method of claim 1, wherein the first trained neural network is included in an encoder network of a deep autoencoder that further comprises a decoder network, wherein the encoder network comprises a plurality of input nodes and the decoder network comprises a plurality of output nodes.

3. The method of claim 1, further comprising:

fitting a first Gaussian mixture model (GMM) to pixels of the first element in the first digital image;

fitting a second GMM to pixels of the second element in the first digital image; and detecting the affinity between the first and second elements based on a degree of similarity between the first GMM and the second GMM.

4. The method of claim 1, wherein a type of the information requested by the user is selected from the group consisting of weather information, traffic information, and event information.

5. The method of claim 1, wherein the detecting that the search result conveys the second context comprises detecting that the search result includes at least one characteristic corresponding to one of the specified plurality of characteristic categories.

6. The method of claim 1, further comprising generating the machine-generated digital image using a Generative Adversarial Network (GAN), wherein the GAN comprises the second trained neural network.

7. The method of claim 6, wherein the GAN comprises a generator and a discriminator, wherein the generator includes the second trained neural network as a generator neural network, and wherein the discriminator includes a third trained neural network as a discriminator neural network.

8. The method of claim 7, further comprising training the discriminator neural network of the GAN based on training data, input to the discriminator neural network, comprising actual digital images and machine-generated digital images generated by the generator neural network of the GAN.

9. The method of claim 8, further comprising training the generator neural network of the GAN to generate machine-generated digital images approximating actual digital images.

10. The method of claim 9, wherein the training of the generator neural network comprises:

receiving, by the generator neural network of the GAN, at least one actual digital image;

inputting, by a noise generator, a noise input to the generator neural network;

generating, by the generator neural network, at least one machine-generated digital image based on a combination of the at least one actual digital image and the noise input;

providing the at least one actual digital image and the at least one machine-generated digital image to the discriminator neural network of the GAN;

analyzing, by the discriminator neural network, the at least one actual digital image and the at least one machine-generated digital image, the analyzing including labelling each of the at least one actual digital image and the at least one machine-generated digital image with one of an actual image classification and a machine-generated image classification; and modifying an operational parameter of the generator neural network based on classification results from the analyzing by the discriminator neural network.

11. A computer program product, the computer program product comprising one or more computer readable storage media, and program instructions collectively stored on the one or more computer readable storage media, the program instructions executable by one or more processors to cause the one or more processors to perform operations comprising:

ingesting a plurality of external drivers usable for predicting a plurality of external contexts;

dynamically tagging a set of digital images in a library with labels based on the plurality of external drivers;

analyzing a first digital image in the library using a first trained neural network that classifies the first digital image as having a first context based on a first plurality of characteristics of the first digital image, wherein each of the first plurality of characteristics corresponds to a respective category of a specified plurality of characteristic categories;

generating a data structure that associates first and second elements depicted in the first digital image based on an affinity detected between the first and second elements in the first context, wherein the data structure further includes a plurality of pairs of elements of the first digital image, wherein each of the plurality of pairs of elements is tagged in the data structure with at least one of the plurality of external contexts;

executing a querying process that searches for information requested by a user;

detecting that a search result from the querying process conveys a second context that is different from the first context, wherein the second context is one of the plurality of external contexts according to a specific external driver in the plurality of external drivers;

synthesizing in the data structure a variation of the second element using the specific external driver to form a third element such that the third element has an affinity with the first element in the second context; and rendering a machine-generated digital image that is generated using a second trained neural network and depicts the first element and the third element in the second context by replacing a region of the first digital image having the first plurality of characteristics associated with the first context with a second plurality of characteristics associated with the second context; and returning, upon a determination that the machine-generated digital image corresponds with a derived environmental condition, to the user the information requested by the user combined with the machine-generated digital image, wherein the machine-generated digital image further comprises a second image layer overlaying the third element on the first element according to the second context.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

14. The computer program product of claim 11, wherein the first trained neural network is included in an encoder network of a deep autoencoder that further comprises a decoder network, wherein the encoder network comprises a plurality of input nodes and the decoder network comprises a plurality of output nodes.

15. The computer program product of claim 11, further comprising:

fitting a first Gaussian mixture model (GMM) to pixels of the first element in the first digital image;

fitting a second GMM to pixels of the second element in the first digital image; and detecting the affinity between the first and second elements based on a degree of similarity between the first GMM and the second GMM.

16. The computer program product of claim 11, wherein a type of the information requested by the user is selected from the group consisting of weather information, traffic information, and event information.

17. A computer system comprising one or more processors and one or more computer readable storage media, and program instructions collectively stored on the one or more computer readable storage media, the program instructions executable by the one or more processors to cause the one or more processors to perform operations comprising:

ingesting a plurality of external drivers usable for predicting a plurality of external contexts;

dynamically tagging a set of digital images in a library with labels based on the plurality of external drivers;

analyzing a first digital image in the library using a first trained neural network that classifies the first digital image as having a first context based on a first plurality of characteristics of the first digital image, wherein each of the first plurality of characteristics corresponds to a respective category of a specified plurality of characteristic categories;

generating a data structure that associates first and second elements depicted in the first digital image based on an affinity detected between the first and second elements in the first context, wherein the data structure further includes a plurality of pairs of elements of the first digital image, wherein each of the plurality of pairs of elements is tagged in the data structure with at least one of the plurality of external contexts;

executing a querying process that searches for information requested by a user;

detecting that a search result from the querying process conveys a second context that is different from the first context, wherein the second context is one of the plurality of external contexts according to a specific external driver in the plurality of external drivers;

synthesizing in the data structure a variation of the second element using the specific external driver to form a third element such that the third element has an affinity with the first element in the second context; and rendering a machine-generated digital image that is generated using a second trained neural network and depicts the first element and the third element in the second context by replacing a region of the first digital image having the first plurality of characteristics associated with the first context with a second plurality of characteristics associated with the second context; and returning, upon a determination that the machine-generated digital image corresponds with a derived environmental condition, to the user the information requested by the user combined with the machine-generated digital image, wherein the machine-generated digital image further comprises a second image layer overlaying the third element on the first element according to the second context.

18. The computer system of claim 17, wherein the first trained neural network is included in an encoder network of a deep autoencoder that further comprises a decoder network, wherein the encoder network comprises a plurality of input nodes and the decoder network comprises a plurality of output nodes.

19. The computer system of claim 17, further comprising:

fitting a first Gaussian mixture model (GMM) to pixels of the first element in the first digital image;

fitting a second GMM to pixels of the second element in the first digital image; and detecting the affinity between the first and second elements based on a degree of similarity between the first GMM and the second GMM.

20. The computer system of claim 17, wherein a type of the information requested by the user is selected from the group consisting of weather information, traffic information, and event information.

*   *   *   *   *